(12) United States Patent
Nakajo (10) Patent No.: US 7,224,660 B2
(45) Date of Patent: May 29, 2007

(54) OPTICAL DISK DEVICE AND METHOD OF RECORDING OPTICAL DATA

(75) Inventor: Yukihisa Nakajo, Yokohama (JP)

(73) Assignee: Samsung Electro-Mechanics Co., Ltd., Suwon-si, Kyunggi-Do (KR)

( * ) Notice: Subject to any disclaimer, the term of this patent is extended or adjusted under 35 U.S.C. 154(b) by 521 days.

(21) Appl. No.: 10/873,503

(22) Filed: Jun. 22, 2004

(65) Prior Publication Data

US 2005/0099925 A1    May 12, 2005

(30) Foreign Application Priority Data

Nov. 12, 2003    (JP)    ............................ 2003-382594

(51) Int. Cl.
*G11B 20/10*    (2006.01)

(52) U.S. Cl. ................. 369/59.11; 369/47.51; 369/59.12; 369/53.31

(58) Field of Classification Search ............ None
See application file for complete search history.

(56) References Cited

U.S. PATENT DOCUMENTS 5,345,434 A    9/1994    Ide et al.
6,982,939 B2*    1/2006    Powelson et al. ........ 369/47.53
7,068,579 B2*    6/2006    Tasaka et al. ............ 369/59.24
2003/0214888 A1    11/2003    Kato et al.

FOREIGN PATENT DOCUMENTS

| EP | 1 349 154 | 10/2003 |
| JP | 4-61028 | 2/1992 |
| JP | 2000-030254 | 1/2000 |
| JP | 2003-030837 | 1/2003 |
| JP | 2003-288722 | 10/2003 |
| JP | 2004-355727 | 12/2004 |

* cited by examiner

*Primary Examiner*—Paul W. Huber
(74) *Attorney, Agent, or Firm*—Lee & Morse, P.C.

(57) ABSTRACT

The present invention relates generally to an optical disk device that records and reproduces information on and from an optical recording medium, such as a compact disk or a digital versatile disk. The optical disk device includes a measurement means and a calculation means.

10 Claims, 11 Drawing Sheets

|     | 3TL   | 4TL   | 5TL  | 6TL  |
|-----|-------|-------|------|------|
| 3TP | -6.7  | 0.2   | 17.2 | 24.8 |
| 4TP | -24.2 | -7.1  | 11.7 | 18.6 |
| 5TP | -28.2 | -10.6 | 7.4  | 11.8 |
| 6TP | -23.2 | -1.9  | 12.9 | 18.5 |

(b)

|     | 3TL   | 4TL   | 5TL   | 6TL  |
|-----|-------|-------|-------|------|
| 3TP | -11.4 | -25.6 | -4.8  | 41.3 |
| 4TP | -28.1 | -32.1 | -11.6 | 35.0 |
| 5TP | -29.7 | -34.7 | -11.8 | 27.6 |
| 6TP | -7.2  | 11.9  | 27.5  | 33.7 |

(c)

|     | 3TL  | 4TL   | 5TL   | 6TL |
|-----|------|-------|-------|-----|
| 3TP | -2.4 | -12.9 | -11.0 | 8.3 |
| 4TP | -2.0 | -12.5 | -11.6 | 8.2 |
| 5TP | -0.7 | -12.0 | -9.6  | 7.9 |
| 6TP | 8.0  | 6.9   | 7.3   | 7.6 |

LP in case of edge antecedent space

|     | 3TP  | 4TP   | 5TP   | 6TP   |
| --- | ---- | ----- | ----- | ----- |
| 3TL | 14.2 | -12.2 | -32.3 | -43.6 |
| 4TL | 25.5 | 1.3   | -14.1 | -22.2 |
| 5TL | 41.1 | 17.6  | 4.6   | -3.8  |
| 6TL | 48.1 | 25.4  | 13.3  | 4.5   | posterior mark

|     | 3TP   | 4TP   | 5TP  | 6TP  |
| --- | ----- | ----- | ---- | ---- |
| 3TL | -6.4  | 29.2  | 47.7 | 50.8 |
| 4TL | -33.9 | -2.2  | 12.6 | 13.0 |
| 5TL | -44.3 | -12.2 | 1.3  | 3.1  |
| 6TL | -47.6 | -17.3 | -5.6 | -1.7 | sum

|    | 3T   | 4T   | 5T   | 6T   |
| -- | ---- | ---- | ---- | ---- |
| 3T | 7.8  | 17.1 | 15.4 | 7.2  |
| 4T | -8.5 | -0.9 | -1.5 | -9.2 |
| 5T | -3.1 | 5.4  | 5.8  | -0.7 |
| 6T | 0.5  | 8.1  | 7.7  | 2.7  |

σ:7.4

PL in case of edge posterior mark

|     | 3TL   | 4TL   | 5TL   | 6TL   |
| --- | ----- | ----- | ----- | ----- |
| 3TP | -49.7 | -12.7 | -26.0 | -27.8 |
| 4TP | -9.3  | 14.0  | 6.4   | 7.6   |
| 5TP | 5.9   | 28.4  | 26.6  | 19.1  |
| 6TP | 5.2   | 31.3  | 26.4  | 21.3  | posterior space

|     | 3TL   | 4TL   | 5TL  | 6TL  |
| --- | ----- | ----- | ---- | ---- |
| 3TP | -6.7  | 0.2   | 17.2 | 24.8 |
| 4TP | -24.2 | -7.1  | 11.7 | 18.6 |
| 5TP | -28.2 | -10.6 | 7.4  | 11.8 |
| 6TP | -23.2 | -1.9  | 12.9 | 18.5 | sum

|    | 3T    | 4T    | 5T   | 6T   |
| -- | ----- | ----- | ---- | ---- |
| 3T | -56.3 | -12.5 | -8.9 | -3.0 |
| 4T | -33.5 | 6.9   | 18.0 | 26.2 |
| 5T | -22.4 | 17.8  | 33.9 | 30.9 |
| 6T | -18.0 | 29.4  | 39.3 | 39.8 |

|   | mark jitter value | space jitter value |
|---|---|---|
| ③ | 31.0ns | 26.6ns |
| ④ | 26.2ns | 29.1ns |

|     | 3T | 4T | 5T | 6T | 7T | 8T | 9T | 10T | 11T |
|-----|----|----|----|----|----|----|----|-----|-----|
| 3T  | 1  | 3  | 7  | 13 | 21 | 31 | 43 | 57  | 73  |
| 4T  | 2  | 4  | 8  | 14 | 22 | 32 | 44 | 58  | 74  |
| 5T  | 5  | 6  | 9  | 15 | 23 | 33 | 45 | 59  | 75  |
| 6T  | 10 | 11 | 12 | 16 | 24 | 34 | 46 | 60  | 76  |
| 7T  | 17 | 18 | 19 | 20 | 25 | 35 | 47 | 61  | 77  |
| 8T  | 26 | 27 | 28 | 29 | 30 | 36 | 48 | 62  | 78  |
| 9T  | 37 | 38 | 39 | 40 | 41 | 42 | 49 | 63  | 79  |
| 10T | 50 | 51 | 52 | 53 | 54 | 55 | 56 | 64  | 80  |
| 11T | 65 | 66 | 67 | 68 | 69 | 70 | 71 | 72  | 81  |

OPTICAL DISK DEVICE AND METHOD OF RECORDING OPTICAL DATA

BACKGROUND OF THE INVENTION

1. Field of the Invention

The present invention relates generally to an optical disk device that records and reproduces information on an optical recording medium, such as a compact disk or a digital versatile disk, and a method of recording optical information.

2. Description of the Related Art

Recently, as the Internet becomes popularized by the development of information and communication technology, a lot of information has been interchanged through networks. Under such a circumstance, a read only optical device, such as a Compact Disk-Recordable (CD-R), and a recordable optical disk, such as a Compact Disk-Rewritable (CD-RW), attract attention as information recording media. Recently, as a semiconductor laser used as a laser source has a short wavelength, the diameter of a focus tends to be reduced due to a high Numerical Aperture (NA), objective lens having a high NA and a thin substrate is adopted, high capacity optical disks, such as a. Digital Versatile Disk-Recordable (DVD-R), a Digital Versatile Disk-Rewritable (DVD-RW) and a Digital Versatile Disk-Random Access Memory (DVD-RAM), are used as information recording media.

The recording of information on a CD-R is performed after record information obtained from a Personal Computer (PC) has been converted into Eight to Fourteen Modulation (EFM) signals. However, since a problem arises in that a mark is undesirably formed due to the heat accumulation and short cooling rate of an optical disk attributable to the difference in the composition of a dye recording layer constituting the optical disk, desired marks and spaces are not formed when the EFM signals are recorded.

Accordingly, a method of, with respect to a reference recording waveform, setting unique parameters for each of optical disks being used and maintaining a desired recording quality (hereinafter referred to as "write strategy") is employed.

The write strategy is known to be related to a recording rate as well as the dye of an optical disk, a phase changing material, the film depth of, a dye, or the shape of a groove. Generally, for representative write strategies, there are a method of varying the ratio of a pit and a land, a method of adding an additional pulse to the front end of a recording pulse, a method of changing the rising or falling location of a pulse through the combination of a pit and a land, and a method of making the recording pulse a multi-pulse.

The method of varying the ratio of a pit to a land is implemented in such a way that the length of the pit is shortened at the time of low rate recording, and allows the shapes of the front and rear ends of a generated pit to be improved by irradiating a short pulse onto an optical disk using strong recording power.

The method of adding the additional pulse to the front end of the recording pulse is implemented in such a way that the irradiation of laser gives additional recording power to the front end of a pit difficult to be converted by heat, and allows the shape of the front end of the pit to be improved.

The method of changing the rising or falling location of a pulse using the combinations of pits and lands is to make the difference between the lengths of the pits and the lands uniforms for example, in such a way that the back end location of a land is changed according to the length of an antecedent land because the heat of the antecedent pit is transmitted to the land and influences a next pit, the front end location of the pit is changed according the length of a recording pit because the heat of the recording pit is transmitted to a position in front of the recording pit, the back end location of the pit is changed according to the length of the recording pit because the heat of the recording pit is transmitted to a location behind the recording pit, and the front end location of the land is changed according to the length of a posterior land because the heat of the posterior pit is transmitted to and influences a posterior land.

The method of making the recording pulse a multi-pulse is a method used in a phase change disk, such as a CD-RW, or a DVD. When information is recorded on the phase change disk using continuous pulses, the front end of a recorded pit is eliminated due to the action of heat, so-that the multi-pulse having cooling periods between the pits is used.

As described above, the write strategy is optimized and used for each of the optical disks because of a difference in the composition of a dye recording layer constituting the optical disk or a difference in a recording rate. Accordingly, a drive manufacturer requires various processes and a lot of time to optimize the write strategy.

Additionally, numerous kinds of optical disks that even the drive manufacturing companies are not aware of are sold commercially. Accordingly, it is impossible to prepare write strategies appropriate for all the optical disks currently distributed in the markets.

To solve the above problem, a method of recording a plurality of pieces of information, to which write strategies are converted, on a plurality of tracks, and selecting a write strategy, which allows a production jitter to be minimized, from the recorded write strategies (for example, refer to Japanese Unexamined Pat. Publication No. 2000-30254), or a method of recording information using a special recording pattern and obtaining the combination of a mark and a space having a minimum jitter value or deviation (for example, refer to Japanese Unexamined Pat. Publication No. 2000-30837).

The former method is problematic in that the write strategy finally selected is just the best write strategy in the set write strategies, so that the selected write strategy cannot always be an optimum write strategy. Furthermore, another problem arises in that only a recording region required for a test uses tracks.

Furthermore, the latter method is problematic in that in view of the use of a specific recording pattern, when a specific mark or space is changed, an influence on other marks and spaces are not taken into consideration, so that it is impossible to-set an optimum write strategy on, an optical disk being used through a single recording and reproducing test.

SUMMARY OF THE INVENTION

Accordingly, the present invention has been made keeping in mind the above problems occurring in the prior art, and an object of the present invention is to provide an optical disk device and an optical information recording method, which is capable of setting optimum parameters on an optical disk being used in a short time without using a specific recording pattern.

The invention of claim 1 is an optical disk device for forming marks and spaces on an optical information recording medium and recording or reproducing information, including a measurement means for measuring the lengths of marks and spaces recorded using a reference write strategy and the lengths of marks and spaces recorded using a changed write strategy in which at least one of setting parameters is changed in various combinations of marks and spaces with respect to the reference write strategy; a measurement value storage means for storing the results of the measurement; theoretical length storage means for storing the theoretical lengths of the marks and the spaces; a deviation calculation means for calculating deviations of the marks and the spaces recorded using the changed write strategy, based on the measured lengths of the marks and the spaces stored in the measurement value storage means and the theoretical lengths of the marks and the spaces stored in the theoretical length storage means; and an expansion and contraction amount calculation means for calculating the unique amounts of expansion and contraction of the marks and the spaces, based on the calculated deviations and probabilities of existence of the marks and the spaces.

The invention of claim 6 is an optical information recording method of forming marks and spaces on an optical information recording medium and recording or reproducing. information, including the steps of storing information on the optical information recording medium using a reference write strategy; storing the information on the optical information recording medium using a changed write strategy in which at least one of setting parameters is changed in various combinations of marks and spaces with respect to the reference write strategy; measuring and storing the recorded lengths of the marks and the spaces; calculating the deviations of the marks and the spaces, based on the stored lengths of the marks and the spaces and the theoretical lengths of the marks and the spaces; and calculating unique amounts of expansion and contraction of the marks and the spaces, based on the calculated deviations and probabilities of existence of the marks and the spaces.

In accordance with the above-described inventions, since the unique amounts of expansion and contraction of the marks and the spaces based on the deviations between the lengths of the marks and the spaces recorded using the reference strategy, the lengths of the marks and spaces using the changed write strategy in which at least one setting parameter is changed in a plurality of kinds of the combinations of the marks and the spaces, and theoretical lengths of the marks and the spaces, and the probabilities of existence of the marks and the spaces, the unique amount of expansion and contraction for each of the optical information recording media can be quickly learned in the case where information is recorded by two recording operations using the same write strategy.

The invention of claim 2 is the optical disk device of claim 1, wherein the setting parameters are the front end edge location of a recording pulse, the back end edge location of the recording pulse, the back end edge location of a multi-pulse, the rising edge location of a last off pulse, the pulse width of the last off pulse, a powered pulse width, a multi-pulse width, and the pulse width of an initial pulse.

The invention of claim 7 is the method of claim 6, wherein the setting parameters are the front end edge location of a recording pulse, the back end edge location of the recording pulse, the back end edge location of a multi-pulse, the rising edge location of a last off pulse, the pulse width of the last off pulse, a powered pulse width, a multi-pulse width, and the pulse width of an initial pulse.

The invention of claim 3 is the optical disk device of claim 1, further including jitter value measurement means for measuring jitter values of signals recorded on the optical information recording medium; and sequence determination means for determining a sequence for calculating the unique amounts of expansion and contraction of the marks and the spaces when two or more of the setting parameters are changed, the sequence determination means determines the sequence for calculating the unique amounts of expansion and contraction of the marks and the spaces with respect to each of the setting parameters, based on deviations of the front and back end edges recorded using the reference write strategy and the jitter values of the signals recorded using the changed write strategy.

The invention of claim 8 is the method, of claim 6, wherein, if two of the parameters are changed, the step of changing the parameter includes the steps of calculating deviations in front of and behind the marks and spaces when the information has been recorded using the reference write strategy; measuring jitter values of signals recorded using a write strategy in which setting parameters selected according to the calculated deviations has been changed; and specifying a setting parameter and determining a sequence of execution for each of parameters based on the measured jitter values.

In accordance with the above-described inventions, with the sequence determination means, the sequence of determination of the unique amounts of expansion and contraction of the marks and the spaces can be determined based on deviations in front of and behind edges when the information is recorded using the reference write strategy and the jitter values of the signals recorded using the changed write strategy in which setting parameters are changed, so that the difference between the results can be reduced and the optimum processing sequence can be determined when two or more parameters has been changed.

The invention of claim 4 is the optical disk device of any of claims 1 to 3, further including a write strategy setting means for calculating correction values for the reference write strategy to allow the deviations of the marks and the spaces to fall within a predetermined range, based on the calculated unique amounts of expansion and contraction and calculated probabilities of existence of the marks and the spaces, and setting an optimum write strategy using the calculating correction values.

The invention of claim 9 is the method of any of claims 6 to 8, further including the step of calculating correction values for the reference write strategy to allow the deviations of the marks and the spaces to fall within a predetermined range, based on the calculated unique amounts of expansion and contraction and calculated probabilities of existence of the marks and the spaces, and setting an optimum write strategy using the calculating correction values.

In accordance with the above-described invention, a correction value for the reference write strategy is calculated based on the unique amounts of expansion and contraction of the marks and the spaces and the probabilities of existence so as to allow the deviations of the marks and the spaces to fall within a predetermined range, so that the optimum write strategies can be quickly set on all optical recording media with the deviations of other marks and spaces taken into consideration.

The invention of claim 5 is the optical disk device of claim 4, wherein the write strategy setting means calculates the correction values in the descending sequence of the probability of existence of a mark and a space.

The invention of claim 10 is the method of claim 9, wherein the step of setting the write strategy is performed in the descending sequence of the probability of existence of a mark and a space.

In accordance with the above-described inventions, the calculation of the correcting values is performed in the ascending sequence of the probability of existence that influences other marks and spaces, and thus optimum write strategies can be quickly set on all optical information recording media.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Figure 1:
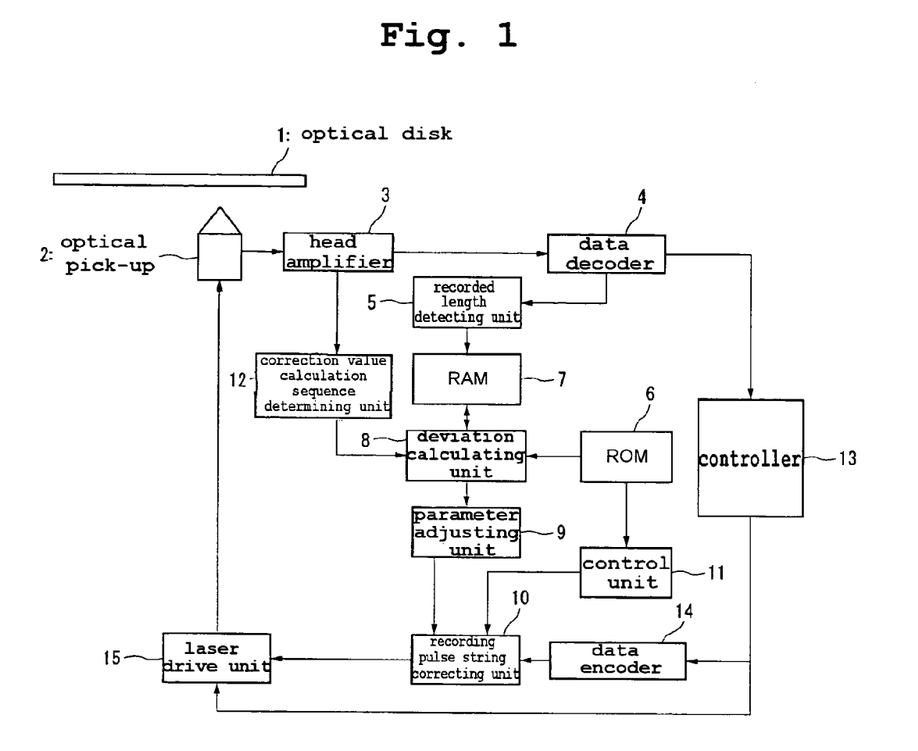
FIG. 1 is a configuration diagram of an optical disk device.

As shown in FIG. 1, an optical disk device according to an embodiment of the present invention includes an optical disk 1, an optical pick-up 2, a head amplifier 3, a data decoder 4, a recorded length detecting unit 5, Read Only Memory (ROM) 6, Random Access Memory (RAM) 7, a deviation calculating unit 8, a parameter adjusting unit 9, a recording pulse string correcting unit 10, a control unit 11, a correction value calculation sequence determining unit 12, a controller 13, a data encoder 14, and a laser drive unit 15.

The optical disk 1 is an optical information recording medium in which the recording, reproducing and removing of information can be performed using semiconductor laser. For such optical disks, there are a CD-R, a CD-RW, a DVD-R, a DVD±RW and a DVD-RAM.

The optical pick-up 2 includes optical parts: a laser optical source, such as a laser diode (not shown), a collimator lens, an object lens configured to be operated by a focus actuator or tracking actuator, a polarizing beam splitter, and a cylindrical lens. The optical pick-up 2 further includes a four-segmented Photo Diode (PD) divided into four regions, such as A, B, C and D, to convert light into electric signals, or two-segmented PD, and a front monitor diode configured to monitor a laser output at the time of recording or reproducing.

The head amplifier 3 detects light reflected from the optical disk 1, calculates the amount of the reflected light, generates both a Radio Frequency (RF) signal representing the total amount of the light reflected to the regions of the four-segmented PD, and a Focus Error (FE) signal representing the detection of the chromatic aberration of the irradiated laser of the optical pick-up 2 according to an astigmatism method, and generates a Tracking Error (TE) signal representing the detection of the offset of irradiated laser of the optical pick-up 2 from-a tract according to a push-pull method. Furthermore, the head amplifier 3 of the present embodiment has both the function of measuring the jitter value of a generated RF signal and the function of detecting the asymmetry of the generated RF signal.

The data decoder 4 generates an EFM signal from the RF signal generated by the head amplifier 3, converts the EFM signal into a signal in a desired form, and outputs the converted signal to the controller 13.

The recorded length detecting unit 5 receives the EFM signal from the data decoder 4, and measures the pulse width of the EFM signal received from a time measuring circuit (not shown).

The ROM 6 is a memory device on which data cannot be overwritten, and stores a method of controlling the entire optical disk device, reference write strategies, the theoretical lengths of marks and spaces, or the probabilities of existence of the combinations of marks and spaces.

The RAM 7 is a memory device on which data can be overwritten, and temporarily stores the amount of correction for each of optical disks, the measurement results of recorded lengths input from the recorded length detecting unit 5, the deviations between the measurement values of the recorded lengths and the theoretical lengths of the marks and the spaces, the unique amounts of expansion and contraction of the marks and the spaces, or the measured jitter values.

The deviation calculating unit 8 compares, the deviation between the measurement values of the recorded lengths stored in the RAM 7 and the theoretical values of the marks and the spaces and the calculated deviation, and outputs the deviation between them.

The parameter adjusting unit 9 calculates correction values for a reference write strategy based on the unique amounts of expansion and contraction of the marks and the spaces stored in the RAM 7 and the probabilities of existence stored in the ROM 6, so as to allow the deviations of the marks and the spaces to fall within a predetermined range.

The recording pulse string correcting unit 10 receives the correction value from the parameter adjusting unit 9, and corrects a recording pulse string to an optimum recording pulse string for an optical disk being used on the basis of the correction value.

The control unit 11 controls the entire optical disk device according to a predetermined control method to record and reproduce information.

The correction value calculation sequence determining unit 12 determines the sequence of output of the unique amounts of expansion and contraction of the marks and the spaces, which correspond to the setting parameters, based on the deviations between in front and at back of edges when information is recorded using the reference write strategy and the jitter values of signals recorded by converting the setting parameters.

The controller 13 is a device for supplying the recording signal to the data encoder 14 and reading the recording signal from the data decoder 4. The data encoder 14 converts the recording signal supplied from the controller 13 into an EFM signal, and outputs the converted EFM signal to the recording pulse string correcting unit 10. The laser drive unit 15 generates a laser diode drive pulse signal corresponding to input recording pulse, and supplies the generated pulse signal to the semiconductor laser (not shown) of the optical pick-up 2.

With reference to FIGS. 2 to 4b, a method of calculating the unique amounts of expansion and contraction of marks and spaces is described below.

In the present embodiment, the probabilities of existence of the combination of the marks and the spaces is used, the extent of influence when the lengths of other spaces or marks is changed is calculated, and the unique amounts of expansion and contraction of the marks and the spaces are calculated using the extent of influence.

This is described in detail with reference to FIGS. 4a and 4b. In essence, the marks and spaces of the EFM signal are constructed so that the sum of the lengths of the marks is equal to the sum of the lengths of the spaces. Accordingly, for example, if the length of a space is lengthened, the balance of the distribution of the marks and the spaces is lost, so that the lengths of all the spaces including the lengthened space are lengthened to correct the lost balance.

In an actual reproducing waveform (RF signal), such a phenomenon is presented by a change in a slice level.

Figure 4A:
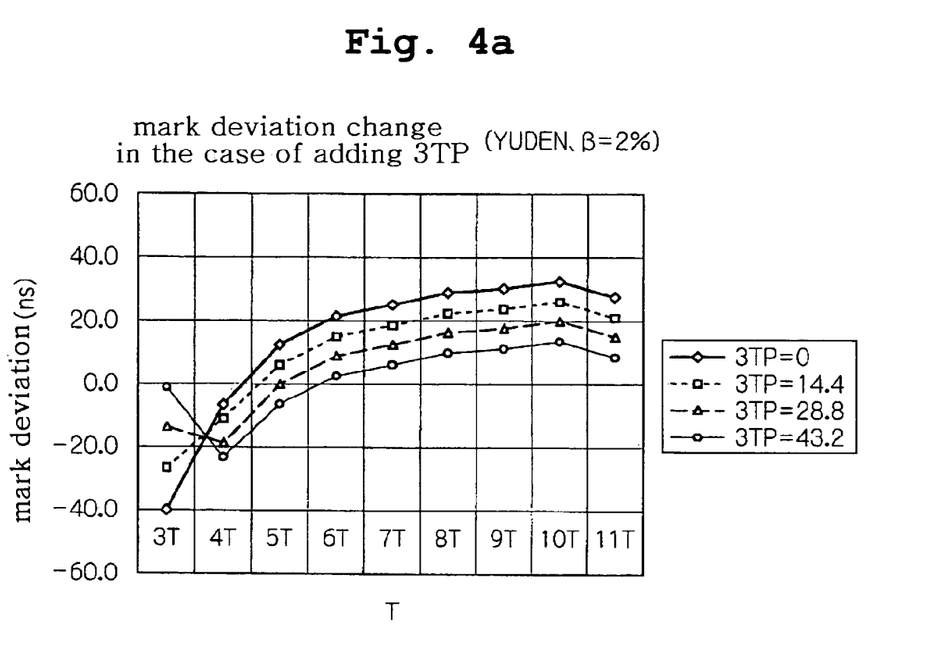
FIGS. 4a and 4b are views showing the extents of influence on other marks when the length of 3 T mark or 6 T is changed.
Figure 4B:
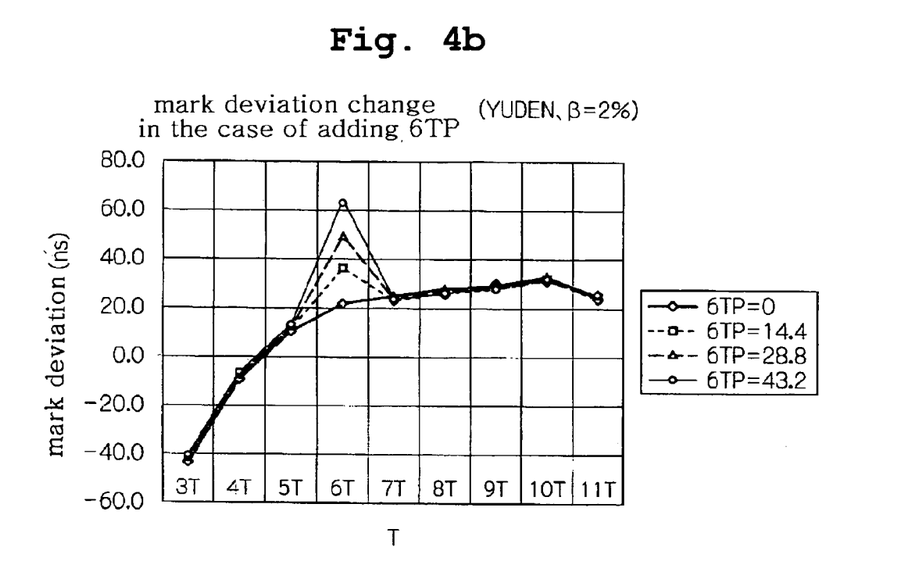

In detail, when 3 T space of an EFM signal is lengthened by $\Delta T$ (3 T), changes in the lengths of other spaces, that is, 4 T to 11 T spaces, are represented as shown in FIG. 4a. FIG. 4a shows deviations from theoretical lengths on a vertical axis, and the distribution of 3 T to 11 T spaces on a horizontal axis. The lines of FIG. 4a show the variations of deviations when the deviation of 3 T space is zero, 14.4 ns, 28.8 ns and 43.2 ns, respectively.

If the probability of existence of 3 T space in the EFM signal is 33%, the correlation of Equation 1 is established between the amounts of change of 4 T to 11 T spaces.

$$\Delta T(3\ T) \times 0.33 = \Delta T(4-11\ T) \times (1-0.33)\ \Delta T(4-11\ T) = 0.33/(\Delta T(4-11\ T) \times (1-0.33)) \quad (1)$$

From Equation 1, it can be known that the amount of change of 4 T to 11 T spaces is about half of that of the 3 T space. This is supported by the results of actual measurement shown in FIG. 4a. As shown in FIG. 4b, it can be known that, when the 6 T space having a low probability of existence is changed in the same way as described above, influence on the lengths of other marks or spaces is considerably small.

Accordingly, with the probabilities of existence of the combinations of the marks and the spaces, the extent of the influence on the lengths of other marks or spaces can be learned when the length of a specific mark or space is changed.

Figure 2:
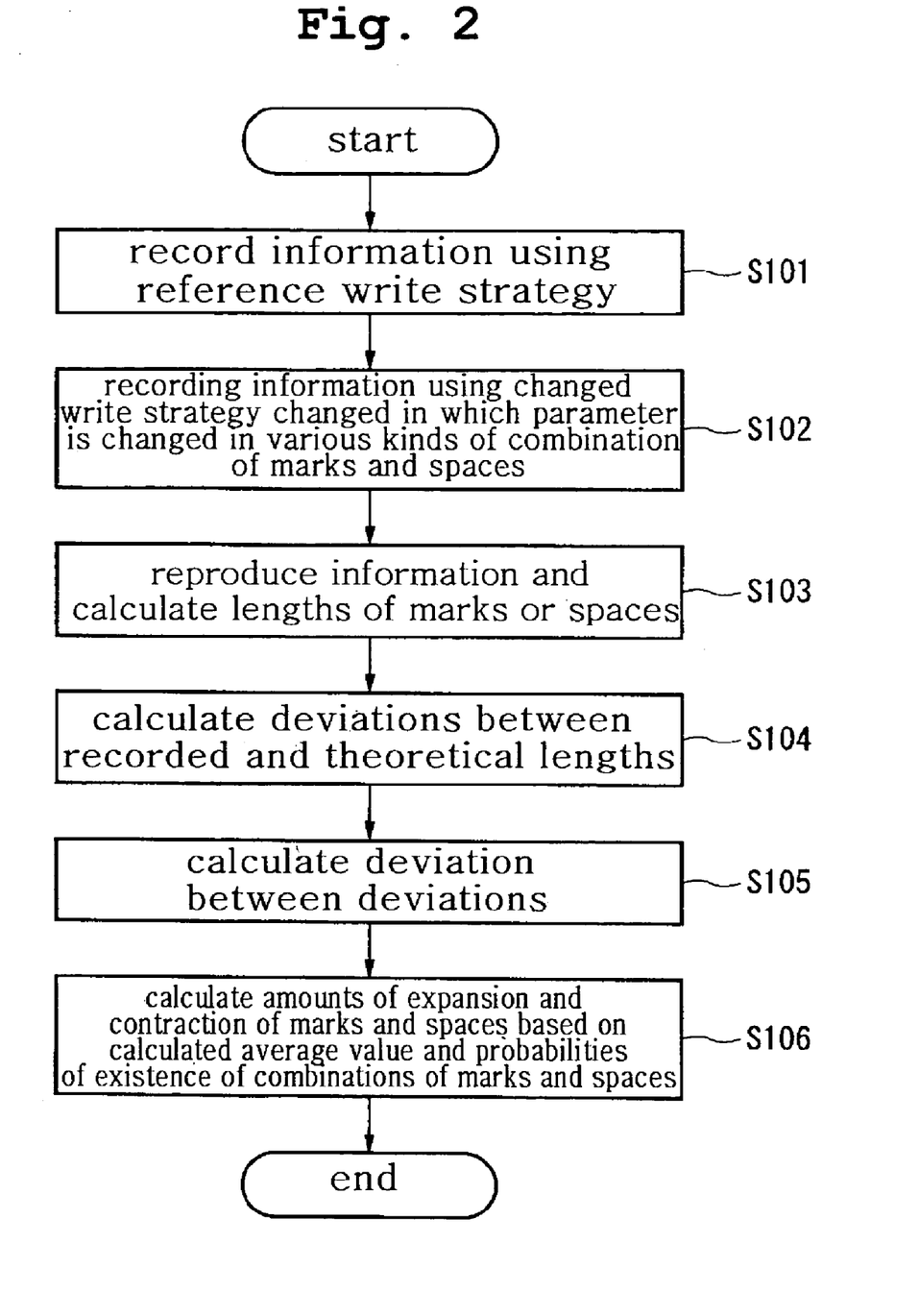
FIG. 2 is a flowchart showing a method of obtaining the unique amounts of expansion and contraction.

On the basis of the above concept, a method of calculating the unique amounts of expansion and contraction of the marks and the spaces in the present embodiment are described with reference to FIGS. 2 and 3 below. The control unit 11 sets the reference write strategy, which is stored in the ROM 6, in the recording pulse string correcting unit 10, and performs a recording operation at step S101. Another recording operation is performed according to a write strategy in which 3 T to 5 T marks in front of 3 T to 5 T spaces, which have large influence on other marks and spaces and the high probabilities of existence, are lengthened integer times the minimum resolution at which a write strategy can be set, at step S102. If the following operation is taken into consideration, the amount of expansion and contraction is preferably the minimum resolution. However, in view of the fact that the minimum resolution is an extremely small value, it is desirable that the amount of expansion and contraction is integer times the minimum resolution to reduce the influence of an error.

If the recording operations have been completed, recording signals are reproduced, recorded lengths for all the combinations of the marks and the spaces are measured by the recorded length detecting unit 5, and the results of the measurement are stored for the write strategy in the RAM 7 at step S103.

The deviation calculating unit 8 calculates deviations between the recorded lengths recorded using the reference write strategy stored in the RAM 7 and the theoretical lengths for the combinations of the marks and the spaces stored in the ROM 6 (refer to FIG. 3a), and deviations between the recorded lengths recorded using the write strategy in which the above-described marks and spaces are lengthened integer times the minimum resolution and the theoretical lengths for all the combination of the marks and the spaces stored in the ROM 6 (refer to FIG. 3b) at step S104. The deviation calculating unit 8 further calculates the deviation between the two deviations (refer to FIG. 3c) at step S105. When the amounts of expansion and contraction of 3 T to 5 T marks in front of 3 T to 5 T spaces for the reference write strategy is integer times the minimum resolution, a deviation for the minimum resolution is obtained by dividing the calculated deviation by the integer.

Figure 3:
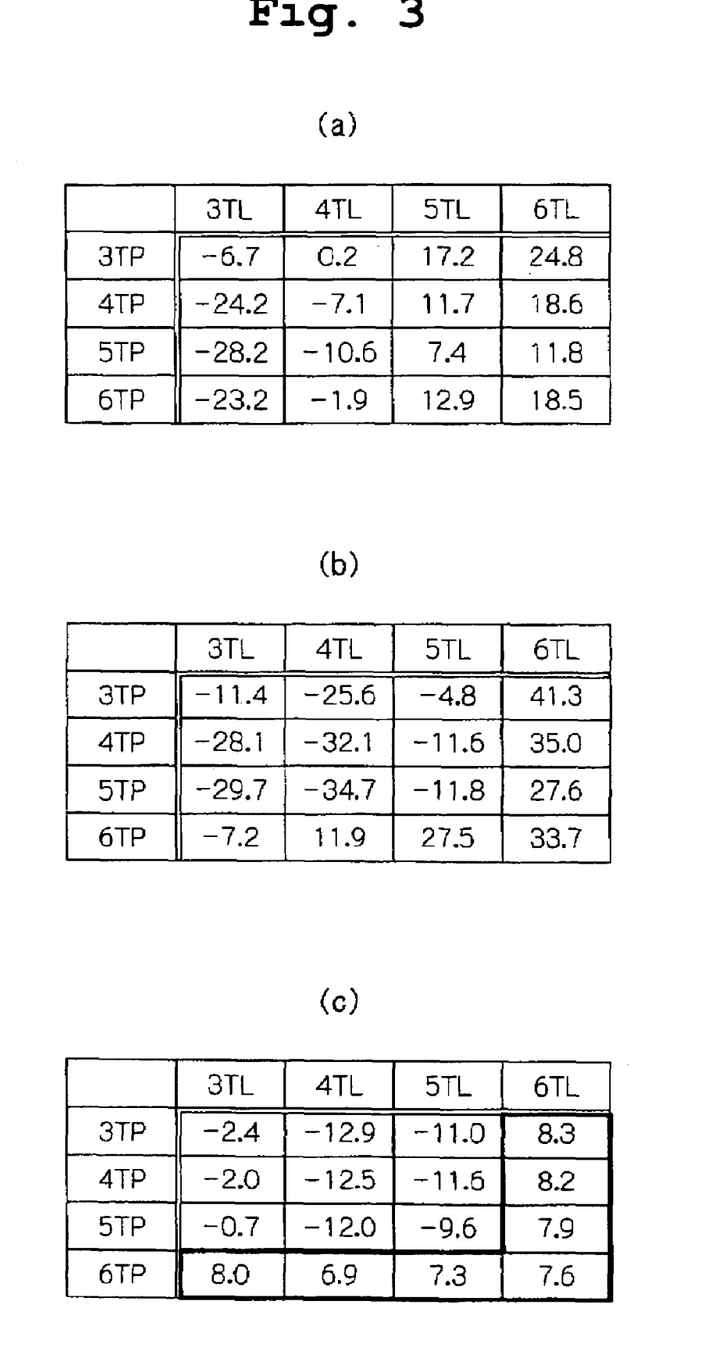
FIGS. 3a to 3c are views showing the examples of obtained deviations.

As shown in FIG. 3a, to calculate the unique amounts of expansion and contraction of the marks and the spaces from the calculated deviation, the probabilities of existence of the combinations of the marks and the spaces are used. For example, when attention is paid to the horizontal axis of 3 TP shown in FIG. 3, the unique amount of expansion and contraction of the combination of 3 T mark and 3 T space is the amount obtained by removing influence produced due to the change of other marks and spaces from the deviation of the combination of the 3 T mark and 3 T space, so that, if it is assumed that the unique amounts of expansion and contraction of the combination of 3 T mark and 3 T space, 3 T mark and 4 T space and 3 T mark and 5 T space are $\Delta T(3,3)$, $\Delta T(4,3)$, and $\Delta T(5,3)$, respectively, the probabilities of existence of the combinations are $R(3,3)$, $R(4,3)$ and $R(5,3)$, respectively, and the deviation of 3 T mark and 3 T space is A, the correlation of Equation 2 is established.

$$\Delta T(3,3) - \Delta T(4,3) \times R(4-3)/(1-R(4,3) - \Delta T(5,3) \times R(5,3)/(1-R(5,3)) = A \quad (2)$$

Meanwhile, referring to entries of FIG. 3a surrounded by the thick lines, for the combinations including 6 T mark or 6 T space, the deviation of an approximate value exists in each of the combinations even though 6 T mark or 6 T space is not changed. This parameter shows the influence attributable to the change of the length of 3 T to 5 T mark in front of 3 T to 5 T spaces.

Accordingly, for example, when the deviation between 3 T mark and 6 T space is set to Z, Z can be represented as Equation 3. Additionally, when Equation 3 is substituted for the corresponding terms of Equation 2, Equation 4 can be obtained. When Equation 4 is described in detail according to the values of FIG. 3a, Equation 5 is obtained. Since the probabilities of existence of the combinations of the marks and the spaces are clarified, the unique amounts of expansion and contraction for the combinations of the marks and the spaces can be obtained using Equation 5 at step S106.

$$Z = \Delta T(3, 3) \times R(3, 3)/(1 - R(3, 3)) + \quad (3)$$
$$\Delta T(3, 4) \times R(4, 3)/(1 - R(4, 3)) + \Delta T(3, 5) \times R(5, 3)/(1 - R(5, 3))$$

$$\Delta T(3, 3) = (Z + A)(1 - R(3, 3)) \quad (4)$$

$$\Delta T(3, 3) = (-2.4 - 7.7) \times (1 - R(3, 3)) \quad (5)$$
$$\Delta T(4, 3) = (-2.0 - 7.7) \times (1 - R(3, 4))$$
$$\Delta T(5, 3) = (-0.7 - 7.7) \times (1 - R(3, 5))$$
$$\Delta T(5, 5) = (-9.6 - 7.7) \times (1 - R(5, 5))$$

Figure 5:
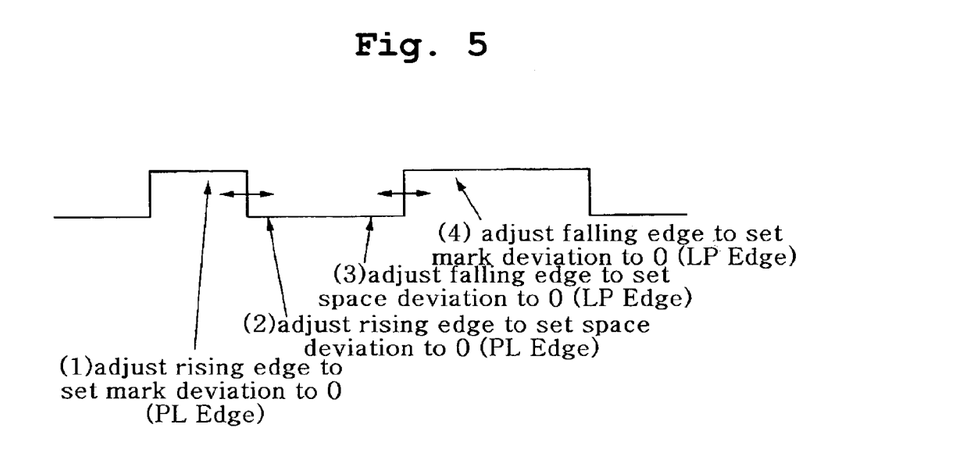
FIG. 5 is a view showing the sequence of selection of an optimum parameter to be adjusted.
Figure 6:
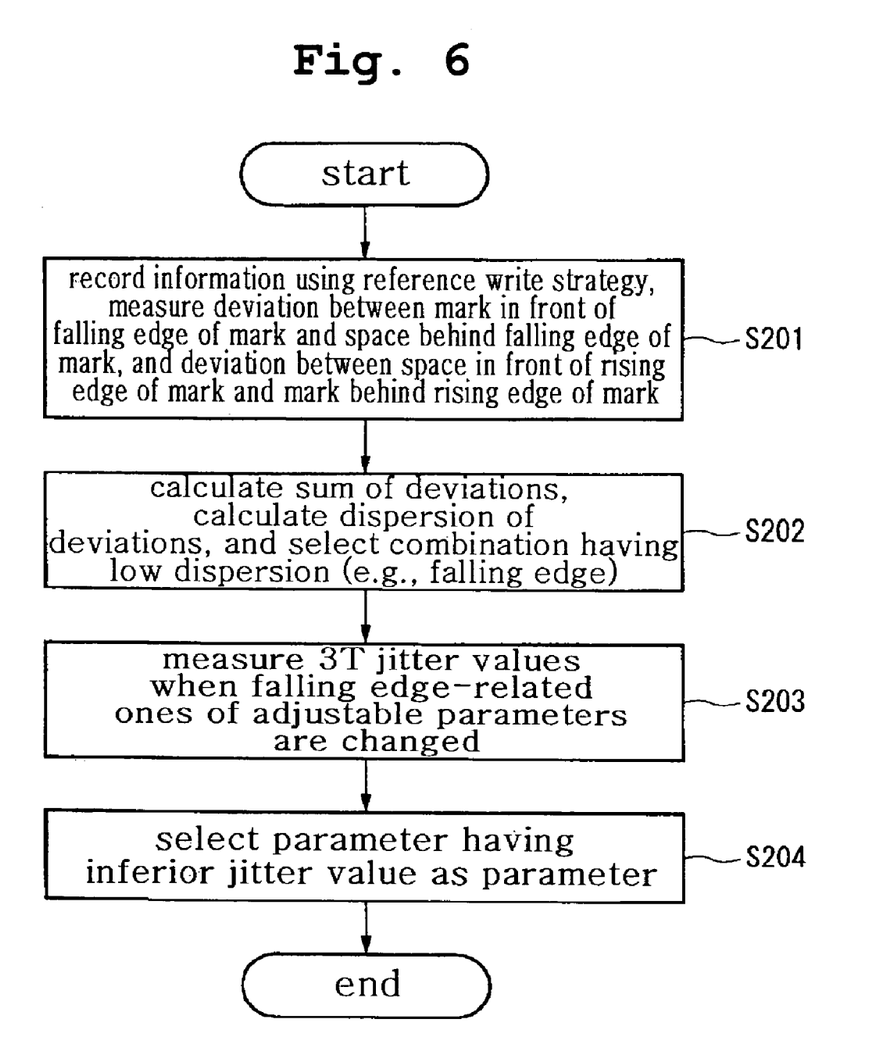
FIG. 6 is a flowchart showing an example to describe the sequence of section of the optimum parameter to be adjusted.

With reference to FIGS. 5 to 8, a method of setting an optimum write strategy in the case where two or more setting parameters are changed is described below. In the description, it is assumed that only the rising and falling edges of a recording pulse can be changed. As shown in FIG. 5, the sequence of determination of which of four adjustment methods is effective is described.

Figure 7:
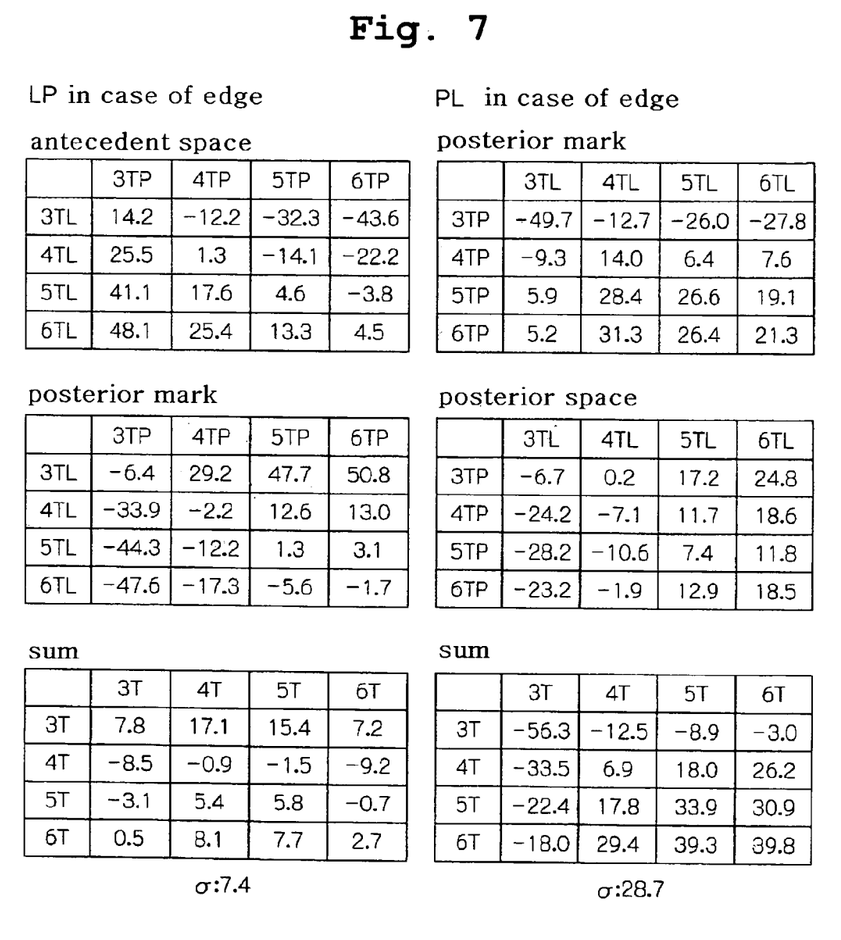
FIG. 7 illustrates tables showing an example to describe the sequence of section of the optimum parameter to be adjusted.
Figure 8:
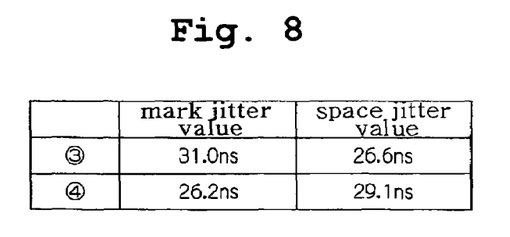
FIG. 8 is a table showing an example to describe the sequence of selection of the optimum parameter to be adjusted.

The control unit 11 performs recording using the reference write strategy, and measures the deviation between a mark in front of the rising edge of a mark and a space behind the falling edge of the mark, and the deviation between a space in front of the rising edge of a mark and a mark behind the rising edge of the mark at step S201. The results of step S201 are shown in FIG. 7. Thereafter, the sum of the deviations measured at the falling and rising edges of the marks are calculated, and the dispersion of the deviations is measured. Generally, when the deviations of first and second measurement related to an edge are adjusted, a remaining deviation can be also adjusted if one of the deviations of the first and second measurement is adjusted. Accordingly, it is effective to select one having lower dispersion. With FIG. 7 taken as an example, the selection of the rising edge is more effective at step S202.

Thereafter, when information is recorded using a write strategy (for example, (n+0.5)T) in which parameters ((3) and (4) of FIG. 5) related to rising edges are changed, 3 T jitters are measured at step S203. One of parameters, which has an inferior jitter value, is set to a parameter to be adjusted. The purpose for which the parameter having the inferior jitter value is to increase the effect of improvement. Accordingly, in the example of FIG. 3, parameter (3) is finally selected.

Figure 9:
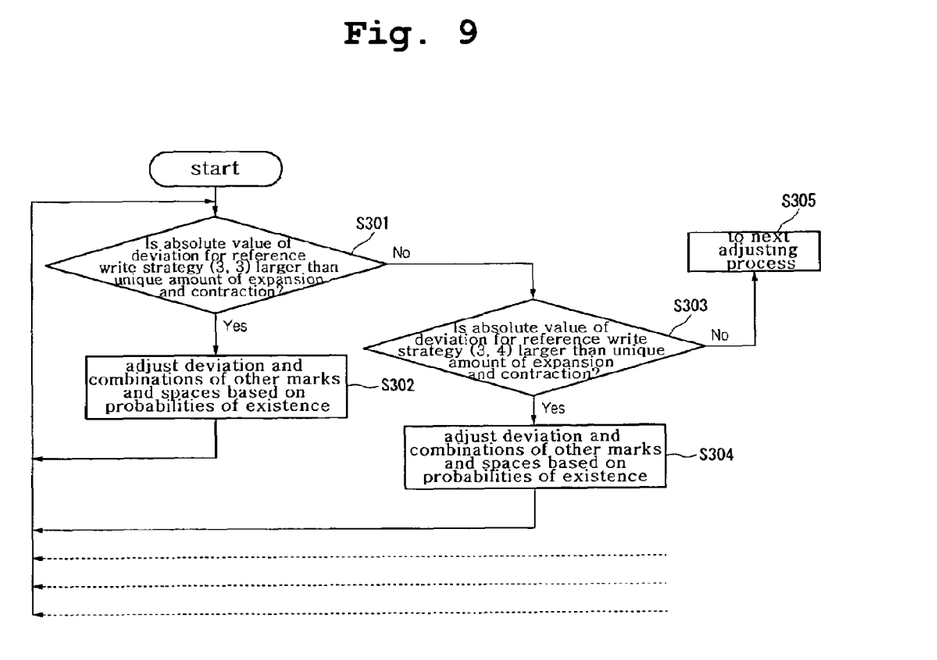
FIG. 9 is a flowchart showing the sequence of obtainment of an optimum write strategy.
Figure 10:
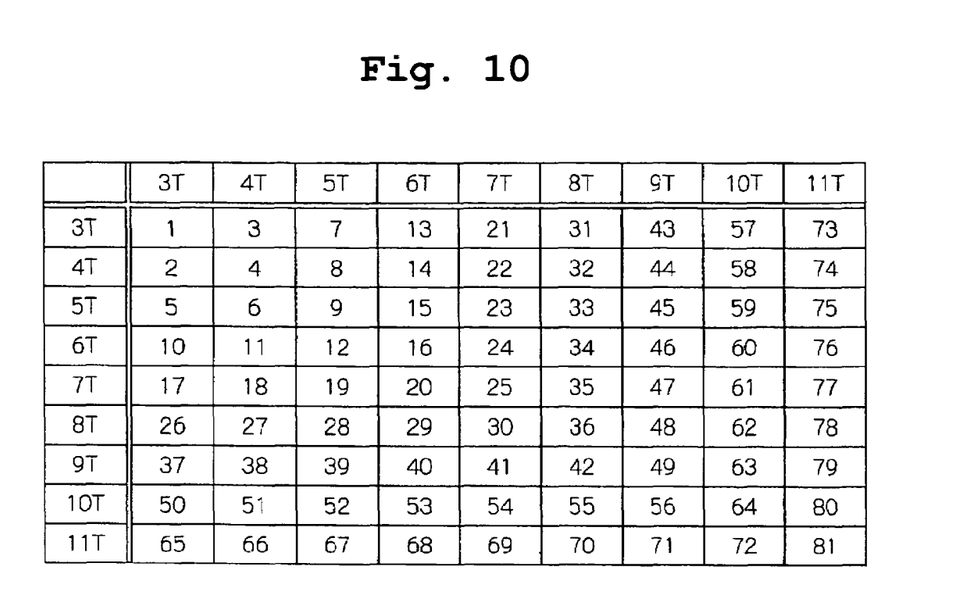
FIG. 10 is a table showing the sequence of adjustment to obtain the optimum write strategy.

With reference to FIGS. 9 and 10, a method of calculating a correction value to set an optimum write strategy is described.

The method of calculating the correction value in the present embodiment is to set the optimum write strategy in such a way as to suppress a write strategy in the case of recording information using the reference write strategy below the above-described minimum resolution through the use of the unique amount of expansion and contraction corresponding to the minimum resolution.

Additionally, the inputs of the correction values of marks and spaces are processed in the descending sequence of the probability of existence. That is, when the combination of the mark and the space having the high probability of existence is adjusted (refer to the processing sequence of FIG. 10), the effect of the adjustment considerably influences the combinations of other marks and spaces. Accordingly, with the performance of the above processing, the correction values acre arranged in a short time.

In detail, as shown in FIG. 9, for the combination of 3 T mark and 3 T space having the highest probability of existence, it is determined whether the absolute value of a deviation related to the reference write strategy is larger than the unique amount of expansion and contraction at step S301. If, as a result of the determination, the absolute value of the deviation related to the reference write strategy is higher than the unique amount of expansion and contraction, deviations are adjusted based on the probabilities of existence with respect to the combinations of other marks and spaces at the same time that the deviation is adjusted at step S302.

Meanwhile, if the absolute value of the deviation related to the reference write strategy is smaller than the unique amount of expansion and contraction, adjustment is performed for the combination of 3 T mark and 4 T space having the next higher probability of existence at steps S303 and S304. The adjustment for the combination of the 3 T mark and 4 T space is performed in the same manner as the adjustment for the combination of 3 T mark and 3 T space at steps, and adjustment for the combination of 11 T mark and 11 T space is performed in the same manner.

Figure 11:
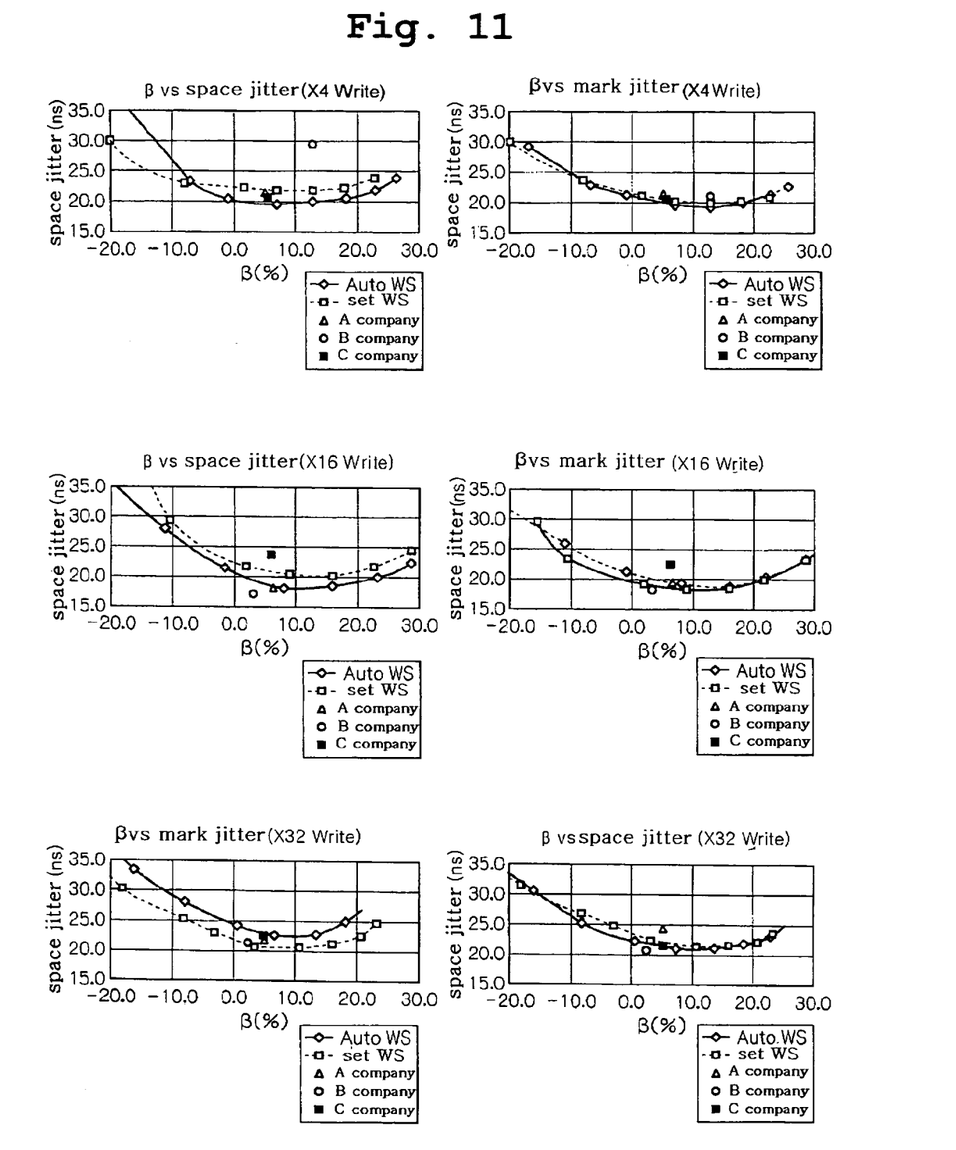
FIG. 11 is a view showing the effect of the present invention.

FIG. 11 is graphs showing performance comparisons based on β and jitter values when information is recorded on a CD-R disk while varying the speed of recording. In this case, Auto WS indicates the case where recording is performed using an optimum write strategy set according to the present invention, a set WS indicates the case where recording is performed using optimum write strategy set by a skilled drive designer as conventionally performed, and A, B, and C companies indicates the cases where data are recorded on the same disk using drives manufactured by the A, B, and C companies. From the above graphs, it can be known that there is no difference between the qualities of the recording using the write strategy set by the method of setting the write strategy of the present invention and the qualities of the recording using the write strategy set by the skilled drive designer.

Figure 12:
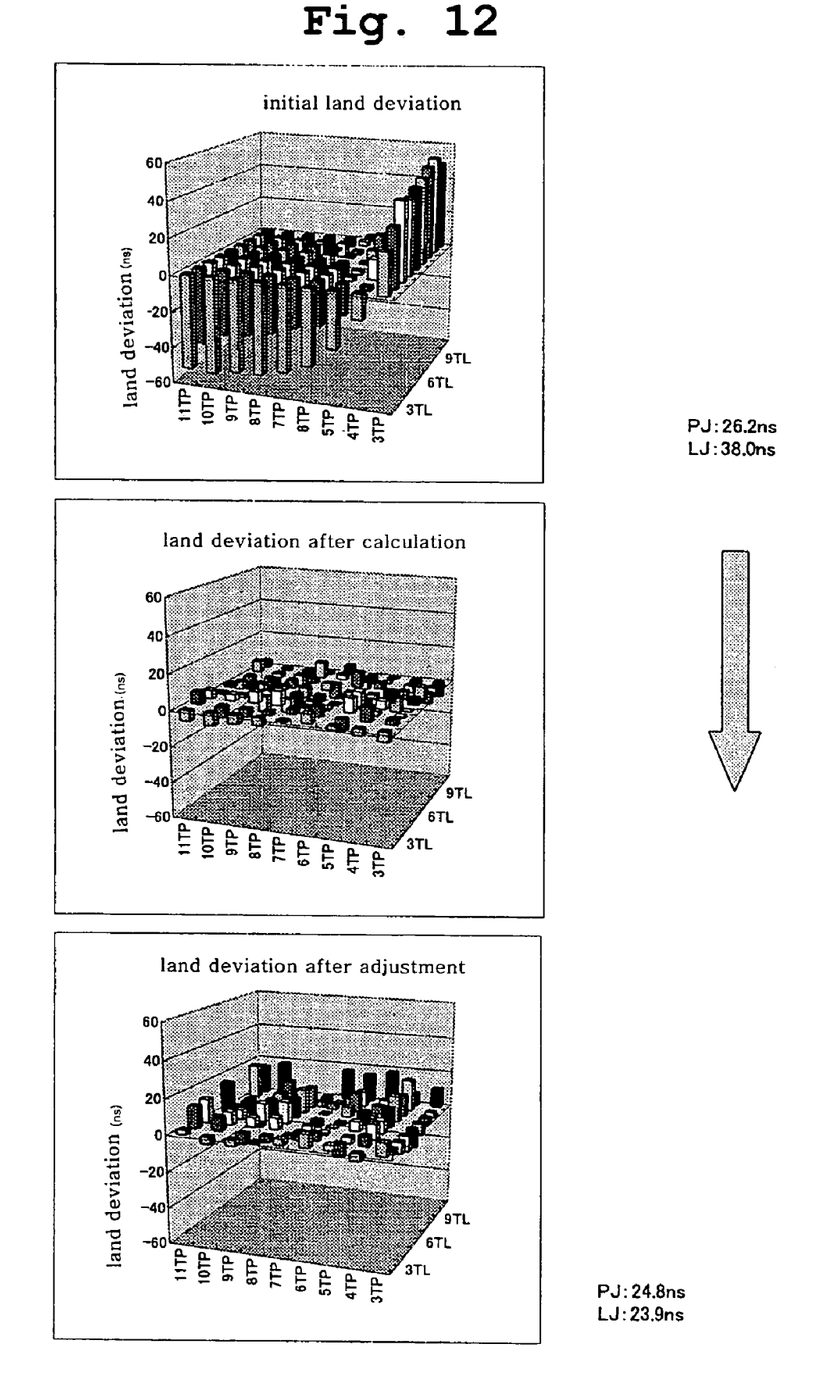
FIG. 12 is another view showing the effect of the present invention.

FIG. 12 is graphs showing a difference in recording quality when the method of setting the write strategy according to the present invention is employed. The upper graph of FIG. 12 represents the deviations of initial lands when recording is performed using the reference write strategy. In this case, the value of a pit jitter is 26.2 ns, and the value of a land jitter is 38.0 ns.

The central graph of FIG. 12 shows the distribution of deviations after the initial deviations are adjusted based on the calculated unique amounts of expansion and contraction and probabilities of existence of lands. In this case, the value of a pit jitter is 24.8 ns, and the value of a land jitter is 23.9 ns, so that a considerably improved effect can be obtained compared to the initial case.

According to the present invention, an optimum write strategy can be set without using a specific recording pattern, with influences on other marks and spaces taken into consideration.

Furthermore, the optimum write strategy can be set through the recording and reproducing of a small amount of information using the probabilities of existence of marks and spaces.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical disk device for forming marks and spaces on an optical information recording medium, and recording or reproducing information, comprising:
    measurement means for measuring lengths of marks and spaces recorded using a reference write strategy and lengths of marks and spaces recorded using a changed write strategy in which at least one of setting parameters is changed in various combinations of marks and spaces with respect to the reference write strategy;
    measurement value storage means for storing results of the measurement;
    theoretical length storage means for storing-theoretical lengths of the marks and the spaces;
    deviation calculation means for calculating deviations of the marks and the spaces recorded using the changed write strategy, based on the measured lengths of the marks and the spaces stored in the measurement value storage means and the theoretical lengths of the marks and the spaces stored in the theoretical length storage means; and
    expansion and contraction amount calculation means for calculating unique amounts of expansion and contraction of the marks and the spaces, based on the calculated deviations and probabilities of existence of the marks and the spaces.

2. The optical disk device as set forth in claim 1, wherein the setting parameters are a front end edge location of a recording pulse, a back end edge location of the recording pulse, a back end edge location of a multi-pulse, a rising edge location of a last off pulse, a pulse width of the last off pulse, a powered pulse width, a multi-pulse width, and a pulse width of an initial pulse.

3. The optical disk device as set forth in claim 1, further comprising:
    jitter value measurement means for measuring jitter values of signals recorded on the optical information recording medium;, and
    sequence determination means for determining a sequence for calculating the unique amounts of expansion and contraction of the marks and the spaces when two or more of the setting parameters are changed, the sequence determination means determines the sequence for calculating the unique amounts of expansion and contraction of the marks and the spaces with respect to each of the setting parameters, based on deviations of the front and back end edges recorded using the reference write strategy and the jitter values of the signals recorded using the changed write strategy.

4. The optical disk device as set forth in any of claims 1 to 3, further comprising write strategy setting means for calculating correction values for the reference write strategy to allow the deviations of the marks and the spaces to fall within a predetermined range, based on the calculated unique amounts of expansion and contraction and calculated probabilities of existence of the marks and the spaces, and setting an optimum write strategy using the calculating correction values.

5. The optical disk device as set forth in claim 4, wherein the write strategy setting means calculates the correction values in a descending sequence of the probability of existence of a mark and a space.

6. An optical information recording method of forming marks and spaces on an optical information recording medium, and recording or reproducing information, comprising the steps of:
    storing information on the optical information recording medium using a reference write strategy;
    storing the information on the optical information recording medium using a changed write strategy in which at least one of setting parameters is changed in various combinations of marks and spaces with respect to the reference write strategy;
    measuring and storing recorded lengths of the marks and the spaces;
    calculating deviations of the marks and the spaces, based on the stored lengths of the marks and the spaces and theoretical lengths of the marks and the spaces; and
    calculating unique amounts of expansion and contraction of the marks and the spaces, based on the calculated deviations and probabilities of existence of the marks and the spaces.

7. The method as set forth in claim 6, wherein the setting parameters are a front end edge location of a recording pulse, a back end edge location of the recording, pulse; a back end edge location of a multi-pulse, a rising edge location of a last off pulse, a pulse width of the last off pulse, a powered pulse width, a multi-pulse width, and a pulse width of an initial pulse.

8. The method as set forth in claim 6, wherein, if two of the parameters are changed, the step of changing the parameter comprises the steps of:
    calculating deviations in front of and behind the marks and spaces when the information has been recorded using the reference write strategy;
    measuring jitter values of signals recorded using a write strategy in which setting parameters selected according to the calculated deviations has been changed; and
    specifying a setting parameter and determining a sequence of execution for each of parameters based on the measured jitter values.

9. The method as set forth in any of claims 6 to 8, further comprising the step of calculating correction values for the reference write strategy to allow the deviations of the marks and the spaces to fall within a predetermined range, based on the calculated unique amounts of expansion and contraction and calculated probabilities of existence of the marks and the spaces, and setting an optimum write strategy using the calculating correction values.

10. The method as set forth in claim 9, wherein the step of setting the write strategy is performed in a descending sequence of the probability of existence of a mark and a space.

* * * * *